United States Patent

Morris et al.

[15] 3,707,091
[45] Dec. 26, 1972

[54] DUAL PICK-OFF ELECTRONIC CIRCUITRY FOR LINEAR SERVO ACCELEROMETER

[72] Inventors: Harold D. Morris, Orinda; Andrew B. Barlak, Jr., Berkeley, both of Calif.

[73] Assignee: Systron Donner Corporation, Concord, Calif.

[22] Filed: June 18, 1970

[21] Appl. No.: 47,270

[52] U.S. Cl. ...................................................73/517
[51] Int. Cl. .............................................G01p 15/08
[58] Field of Search..............................73/516, 517

[56] References Cited

UNITED STATES PATENTS

| | | | |
|---|---|---|---|
| 3,461,400 | 8/1969 | Koda | 73/517 X |
| 2,939,072 | 5/1960 | Bell | 73/517 X |

*Primary Examiner*—James J. Gill
*Attorney*—Flehr, Hohbach, Test, Albritton & Herbert

[57] ABSTRACT

Dual pick-off electronic circuitry for linear servo accelerometer of the type having an unbalanced mass in the form of a conducting element. First and second pick-off coils disposed on opposite sides of the conducting element. First and second oscillators are connected to the first and second pick-off coils in such a manner that the first pick-off coil forms a part of the tank circuit of the first oscillator and the second pick-off coil forms a part of the tank circuit of the second oscillator. Means is provided for interconnecting the first and second oscillators so that the first and second oscillators operate in synchronism at substantially identical frequencies. Means is provided for rectifying the outputs of the first and second oscillators and a differential amplifier having dual input and dual output is utilized for receiving the rectified signals. A.C. feedback means is provided for controlling the open loop gain and also for providing temperature stabilization. Means is provided for converting the double ended output of the differential amplifier to a single ended output for driving a torque coil which is connected to the conducting element to oppose the forces of acceleration on the conducting element.

13 Claims, 2 Drawing Figures

INVENTORS
Harold D. Morris
Andrew B. Barlak
BY
Attorneys

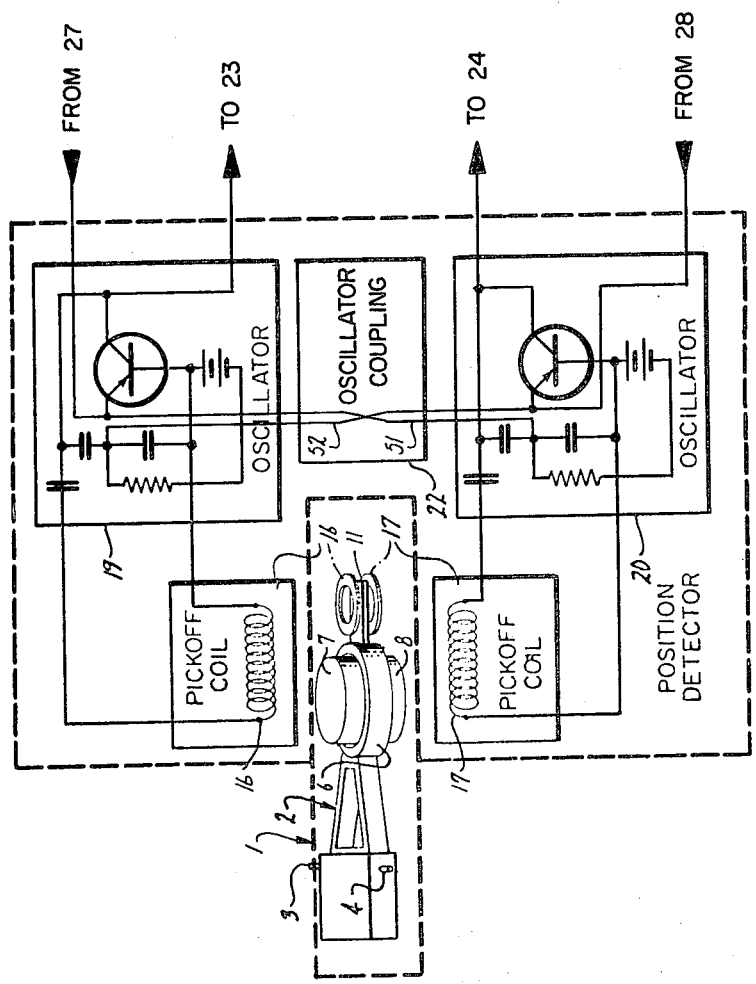

DUAL PICK-OFF ELECTRONIC CIRCUITRY FOR LINEAR SERVO ACCELEROMETER

BACKGROUND OF THE INVENTION

Linear servo accelerometers and electronics for such accelerometers have heretofore been provided. Electronics for such accelerometers is disclosed in U.S. Pat. No. 3,074,279 and in U.S. Pat. No. 3,109,145. The electronic circuitry which is disclosed in U.S. Pat. No. 3,074,279 has a distinct disadvantage in that the position of the pick-off paddle with respect to the pick-off coil varies with temperature. In other words, the accelerometer null angle is temperature sensitive. There is a need for a linear servo accelerometer and electronics therefor which is relatively insensitive to temperature changes.

SUMMARY OF THE INVENTION AND OBJECTS

The dual pick-off electronic circuitry for linear servo accelerometers of the type which has an unbalanced mass in the form of a conducting element consists of first and second pick-off coils disposed on opposite sides of the conducting element. First and second oscillators are connected to the first and second pick-off coils in such a manner that the first pick-off coil forms a part of the tank circuit of the first oscillator and the second pick-off coil forms a part of the tank circuit of the second oscillator. Means interconnects the first and second oscillators so that they operate in synchronism at substantially identical frequencies. Means is provided for rectifying the outputs of the first and second oscillators. A differential amplifier having dual input and dual output is provided for receiving the outputs from the rectifying means. A torque coil is connected to the conducting element. Means is provided for converting the dual output and for connecting it to the torque coil so that the torque coil is utilized to oppose the forces of acceleration applied to the conducting element. Means is provided for controlling the open loop gain of the accelerometer. In addition, means is provided for temperature stabilizing each of the oscillators.

In general, it is an object of the present invention to provide dual pick-off electronic circuitry for use with linear accelerometers to make the accelerometers relatively independent of temperature changes.

Another object of the invention is to provide circuitry of the above character which is not unduly complicated and which can be readily adjusted.

Additional objects and features of the invention will appear from the following description in which the preferred embodiments are set forth in detail in conjunction with the accompanying drawing.

BRIEF DESCRIPTION OF THE DRAWINGS

FIG. 2 shows a portion of a circuit diagram showing another embodiment of dual pick-off electronic circuitry incorporating the present invention.

DESCRIPTION OF THE PREFERRED EMBODIMENT

Figure 1:
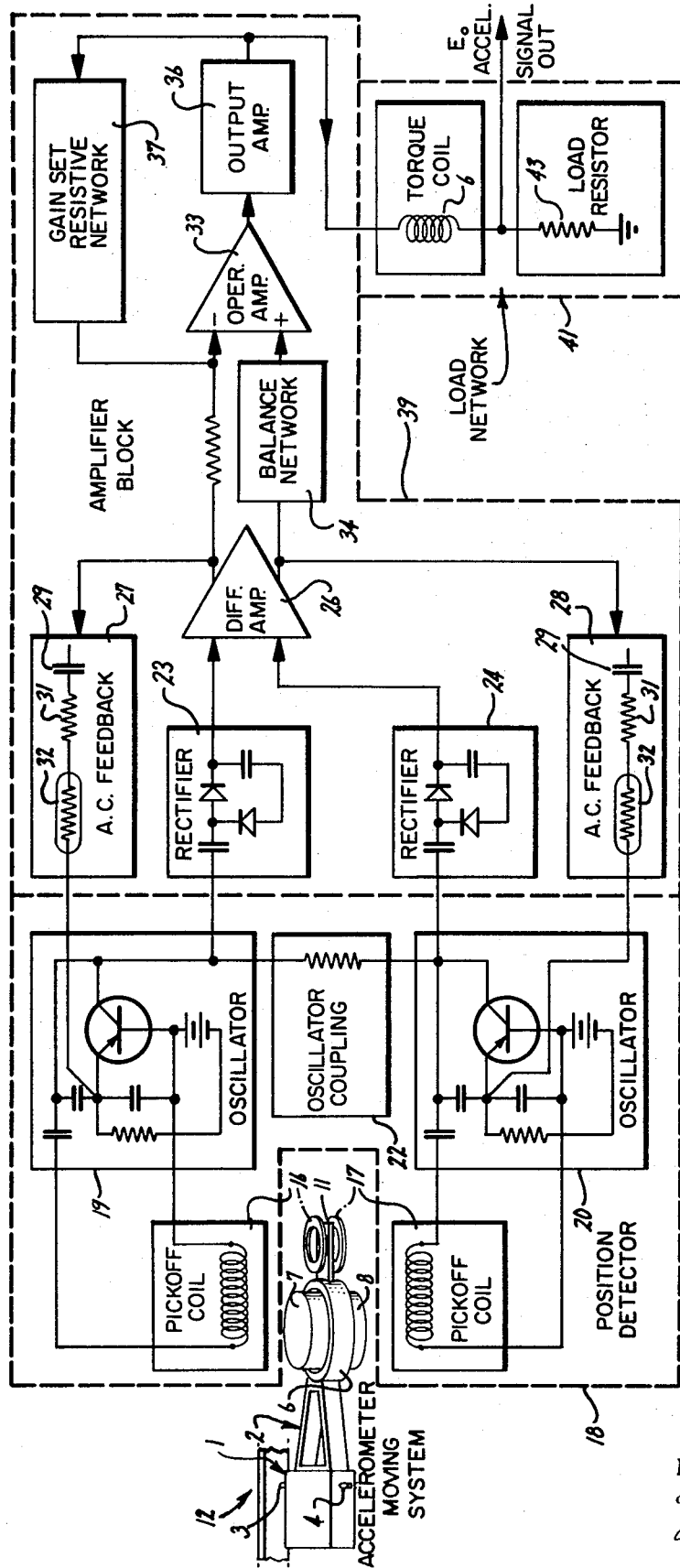
FIG. 1 shows a circuit diagram partially in block form of dual pick-off electronic circuitry of the type incorporating the present invention for use with a linear servo accelerometer.

In copending application Ser. No. 47,346 filed, June 18, 1970, there is disclosed a linear accelerometer mechanism for use with the dual pick-off electronic circuitry disclosed herein. As disclosed therein and as shown in the drawing such a mechanism includes a housing 1 and a pendulous member 2. Pivot assemblies 3 and 4 provided for pivotally mounting the pendulous member in the housing. A torque coil 6 is carried by the pendulous member. First and second magnets 7 and 8 are mounted in the housing opposite sides of the torque coil 6 and establish a magnetic field in the vicinity of the torque coil. A conducting planar element or paddle 11 is carried by the pendulous member. First and second pick-off coils 16 and 17 are mounted within the housing and are disposed on opposite sides of the conducting planar element 11. The linear servo accelerometer moving system is indicated as the block 12. An arrow 13 indicates the direction of movement of the paddle 11 as acceleration forces are applied to the accelerometer moving system 12.

The pick-off coils 16 and 17 form a part of a position detector 18. The position detector 18 includes first and second oscillators 19 and 20 which are connected to the pick-off coils 16 and 17. The oscillators 19 and 20 are conventional and, for example, can be either the Hartley or Colpitts type. As can be seen from the drawings, the oscillators 19 and 20 are shown as conventional Colpitts split capacitor type oscillators in which the pick-off coil connected thereto serves as an inductor in the tank circuit of the oscillator. The operation of such oscillators is described in U.S. Pat. No. 3,074,279. In general, the conducting metal paddle 11 spoils the Q of the coil when it moves in close proximity thereto. Eddy currents are induced into the metal plate by the alternating magnetic field created by the pick-off coil. Other effects are also described in U.S. Pat. No. 3,074,279. As the paddle moves closer to the pick-off coil, it increases the losses in the coil and decreases the magnitude of the inductance. Since the pick-off coil is an integral part of the oscillator, any changes in the losses and/or inductance of the pick-off coil will affect both the amplitude and frequency of oscillation of the oscillator.

By way of example, each of the oscillators 19 and 20 is designed so that it will operate near 5 MHz. However, the exact frequency of operation of the oscillator is not critical and, in fact, the oscillator can tolerate frequency variations of ± 20 percent. In order to obtain maximum temperature stability, the components in the two oscillators 19 and 20 are closely matched in values and temperature coefficients to achieve close tracking of the oscillator outputs with temperature changes.

The outputs of the two oscillators 19 and 20 are tightly coupled to each other by a resistive coupling 22 so that there is a common frequency of oscillation thereby eliminating heterodyning or frequency beating. In providing such coupling between the two oscillators, it is still necessary that each oscillator be sensitive to the position of the paddle with respect to the pick-off coil associated with the oscillator. In other words, the oscillator must have the capability of running independently but at the same time running synchronously with the other oscillator. More specifically, this resistive coupling between the two tank circuits, made up of the two pick-off coils and the tuning capacitors of the two oscillators, requires that the tank circuits operate in synchronism at identical frequencies going positive and negative at the same time to prevent dissipation in the resistive oscillator coupling. However, this does not prevent amplitude modulation of each oscillator by the paddle 11 of the accelerometer moving system.

The outputs of the oscillators 19 and 20 are fed into first and second rectifiers or detectors 23 and 24. As can be seen, the rectifier circuits 23 and 24 are conventional half-wave voltage doubler type circuits and produce a d.c. potential which is directly proportional to the amplitude of the radio frequency signal applied to the rectifiers. The d.c. outputs from these two rectifiers 23 and 24 are supplied to a differential amplifier 26. The differential amplifier 26 is of a conventional type and is provided with two inputs and two outputs. The differential amplifier consists either of monolithic design or of dual transistors with common emitters and a resistor in each collector circuit with the two inputs being applied to the two bases and the two outputs being derived from the two collectors. With such a differential amplifier, as the two inputs move up and down, the division of current between the two transistors is identical and thus the two collectors will move up and down and not produce a differential output. The two input-output differential amplifier is utilized because of the desirability to provide two feedback networks as hereinafter described.

The signal levels from the rectifiers 23 and 24 are raised substantially by the differential amplifier 26. Parts of the two outputs from the differential amplifier 26 are supplied to a.c. feedback circuits 27 and 28. Each of the feedback circuits consists of a d.c. blocking capacitor 29, a resistor 31 connected in series with a capacitor 29 and a thermistor connected between the two series capacitors of the tank circuit of each oscillator as shown in the drawing. The thermistors provided in the a.c. feedback paths vary the amount of signal which is fed back to the oscillator in accordance with the temperature of the accelerometer and thereby compensate for the change in transient response caused by the variation in viscosity of the damping fluid utilized in the mechanism of the linear servo accelerometer.

The remainders of the output signals from differential amplifier 26 are supplied to the inputs of an operational amplifier 33. A balance network 34 consisting of a pair of resistors is provided in the second output of the differential amplifier and serves to compensate for the unbalanced input impedance to the operational amplifier and creates a true differential voltage output. In other words, the balance network 34 serves to provide equal drive to the two inputs of the operational amplifier so that the common mode signal from the differential amplifier 26 is effectively nulled out by the differential amplifier performance of the operational amplifier 33. For a true differential output voltage from collector to collector of the dual transistor differential amplifier 26, both load and impedances must be equal and the differential d.c. potential must be zero for equal transistor currents. Since the input impedances of the operational amplifier 33 are not balanced, the balance or compensating network 34 adjusts the load impedance to ensure a true differential output from the differential amplifier 26. Since the two a.c. feedback networks 27 and 28 are identical, their effects on the output impedances of the differential amplifier 26 can be neglected.

The operational amplifier 33 serves to convert the differential signal from the differential amplifier 26 to a single-ended signal which is supplied to a power booster stage in the form of an output amplifier 36. The output amplifier 36 is included within the closed loop of the operational amplifier by a gain set resistive network 37 connected between the output amplifier 36 and one of the inputs to the operational amplifier 33. Under steady state high acceleration inputs, high open loop amplifier gain is desirable if accurate alignment of the accelerometer moving system null position is to be maintained. High frequency inputs require reduced open-loop amplifier gain for the required system closed-loop stability. Open loop gain must be a function of frequency. The resistive feedback network 37 controls the open loop gain. The operational amplifier 33 together with the associated output amplifier 36 comprise a fixed gain, low output impedance amplifier.

The rectifiers 23 and 24, the a.c. feedback networks 27 and 28, the differential amplifier 26, the balance network 34, the operational amplifier 33, the output amplifier 36 and the gain set resistive network 37 are included in a block 39 which has been given the designation "Amplifier." The output amplifier 36 is supplied to a load network 41. The load network 41 consists of a torque coil 6 which forms a part of the torque motor of the linear servo accelerometer described in copending application Ser. No. 47,346, filed June 18, 1970. The load network also includes a load resistor 43 which is connected in series with the torque coil 6 to ground. If desired, the load network can also include additional trimming resistors which have not been shown. The inductive impedance of the torque coil is negligible at the operating frequencies of the accelerometer and need not be considered. The major resistances in the load network 41 are the resistance of the torque coil 6 and the load resistor 43. Variations in scale factor and bias voltage due to component manufacturing tolerances can be readily trimmed out by compensating resistors which can form a part of the load network 41. A signal which is proportional to the acceleration being sensed by the accelerometer is supplied on the output terminal identified as $E_0$.

Operation of the dual pick-off electronic circuitry in a linear servo accelerometer may now be briefly described as follows. Let it be assumed that the electronic circuitry has been incorporated as a part of the linear servo accelerometer and that acceleration is being applied to the linear servo accelerometer in the direction of its sensitive axis. As this occurs, the paddle 11 will be moved from its null or center position between the pick-off coils 16 and 17 towards one of the coils and away from the other of the coils. Since the oscillators are amplitude modulated, as the paddle 11 moves from a null position towards one of the coils, the amplitude of oscillation will decrease and, conversely, as the paddle moves away from the other of the coils, the amplitude of modulation of the other oscillator will increase and conversely, when the paddle is moved in the opposite direction from a null position toward the other coil, the amplitude of oscillation of the oscillator which had previously decreased would increase and the amplitude of the other oscillator which had previously increased would decrease. Thus, there is provided a push-pull monotonic relationship between the amplitude of each oscillator and the movement of the paddle of the moving system.

As explained previously, even though the amplitude of oscillation of the oscillators may change, they will still operate in synchronism at identical frequencies because of the oscillator coupling resistor 22. By the utilization of two oscillators with two pick-off coils, it can be seen that each oscillator retains its full gain in which the oscillators are operating with a loop gain of one and this loop gain is modulated above and below one in order to achieve an amplification of the loading effect of the paddle 11 of the moving system.

As explained previously, the two outputs of the oscillators are rectified and amplified and then converted into a single-ended output to drive the torque coil 42 and to provide the output signal $E_0$ which is proportional to the acceleration being applied to the accelerometer. In this manner, it has been possible to provide an accelerometer which is relatively insensitive to temperature changes. As can be seen in the electronic circuitry, differential signal processing is utilized to minimize any change in the sensitive axis of the accelerometer due to temperature changes. The components and particularly critical components of the electronic circuitry are closely matched in initial values and in temperature coefficients. Thus, any drift which occurs is due to differential effects and is an order of magnitude less than the drift in the best temperature compensated single-ended designs.

Another embodiment of the dual pick-off electronic circuitry is shown in FIG. 2. It differs from the embodiment shown in FIG. 1 in that the oscillator coupling 22 is not resistive in form but takes the form of a direct coupling between the oscillators 19 and 20 so that the oscillators 19 and 20 can no longer operate independently. This is accomplished by taking the output from the tank circuit of oscillator 20 and coupling it directly to the input terminal (the emitter) of the transistor of oscillator 19 by a conductor 51 and by taking the output from the tank circuit of oscillator 19 and coupling it directly to the input terminal (the emitter) of the transistor of oscillator 20. Thus it can be seen that the oscillators 19 and 20 are cross coupled to each so that they must operate in synchronism. The oscillators 19 and 20 can still be amplitude modulated in the manner hereinbefore described. As the paddle 11 moves towards pick-off coil 16 thereby reducing the loop gain of oscillator 19, it moves away from the pick-off coil 17 thereby increasing the loop gain of oscillator 20 by an equal amount, so that the product of the gains of the two oscillators 19 and 20 remains constant. This circuit of FIG. 2 has the advantage of improved gain in the form of increased signal level for a predetermined change in paddle spacing while achieving guaranteed synchronism regardless of any mismatch in components in the oscillators.

It is apparent from the foregoing that there has been provided dual pick-off electronic circuitry which is particularly useful for linear servo accelerometers to minimize the effects of temperature changes on the accelerometer.

We claim:

1. In an accelerometer, an unbalanced mass in the form of a planar conducting element which is free to move under the forces of acceleration, first and second pick-off coils disposed on opposite sides of said planar conducting element in relatively close proximity thereto, a first oscillator coupled to said first pick-off coil in such a manner that the pick-off coil forms a part of the tank circuit of the oscillator, a second oscillator coupled to the second pick-off in such a manner that the second pick-off coil forms a part of the tank circuit of the second oscillator, means for electrically coupling said first and second oscillators so that said first and second oscillators operate in synchronism at substantially identical frequencies, first and second rectifiers coupled to the outputs of the first and second oscillators, differential amplifier means coupled to said first and second rectifiers and means connecting the output of the differential amplifier to said torque coil whereby said torque coil is utilized to apply a force to said conducting element to oppose the acceleration forces applied to the conducting element.

2. An accelerometer as in claim 1 wherein said differential amplifier has a dual input and a dual output together with feedback means interconnecting said dual outputs to said first and second oscillators to control the open loop gain of the differential amplifier combined with the oscillator.

3. An accelerometer as in claim 2 wherein said feedback means includes temperature stabilization means.

4. An accelerometer as in claim 1 wherein said means coupling the torque coil to the differential amplifier includes an operational amplifier having two inputs for converting the dual output from the differential amplifier to a single-ended output.

5. An accelerometer as in claim 4 together with a resistive network connected between the operational amplifier and the differential amplifier to null out the common mode signal from the differential amplifier.

6. An accelerometer as in claim 4 together with additional amplifier means for amplifying the output from the operational amplifier and a gain resistive network connected between the output of the output amplifier and one of the inputs to the operational amplifier.

7. An accelerometer as in claim 1 wherein said means electrically coupling, said first and second oscillators includes resistance means.

8. An accelerometer as in claim 1 wherein said means electrically coupling said first and second oscillators includes means for cross coupling said first and second oscillators to each other.

9. An accelerometer as in claim 8 wherein each of said oscillators includes a tank circuit and a transistor having an input terminal and wherein said means for cross coupling includes means for connecting the output of the tank circuit of the first oscillator to the input terminal of the transistor of the second oscillator and means for connecting the output of the tank circuit of the second oscillator to the input terminal of the transistor of the first oscillator.

10. In electronic circuitry for use with an accelerometer of the type having unbalanced mass in the form of a conducting element adapted to be subjected to acceleration forces, first and second pick-off coils adapted to be disposed on opposite sides of the conducting element, first and second oscillators coupled to said first and second pick-off coils so that said first pick-off forms a part of the tank circuit of the first oscillator and the second pick-off coil forms a part of the tank circuit of the second oscillator, means electrically coupling said first and second oscillators so that they operate in synchronism at substantially identical frequencies, first and second rectifiers for rectifying the outputs of said first and second oscillators, differential amplifier means for receiving the outputs from the rectifiers, a torque coil connected to said conducting element and means connecting the output of the differential amplifier to said torque coil whereby said torque coil is used to generate forces to oppose the acceleration forces to said conducting element.

11. Electronic circuitry as in claim 10 wherein said differential amplifier has a dual input and a dual output and wherein said means for connecting the output of the differential amplifier to the torque coil includes means for converting the dual output of the differential amplifier to a single-ended output for the torque coil.

12. Electronic circuitry as in claim 11 together with feedback means connected to the outputs of the differential amplifier and to the first and second oscillators.

13. Electronic circuitry as in claim 12 wherein the tank circuit of each of said oscillators includes a transistor and wherein the feedback means is connected to the input terminals of the transistors.

* * * * *